(12) United States Patent
Douglas et al.

(10) Patent No.: US 12,463,734 B2
(45) Date of Patent: Nov. 4, 2025

(54) SYSTEMS AND METHODS FOR FACILITATING WIRELESS TOKEN INTERACTIONS ACROSS MULTIPLE DEVICE TYPES AND/OR TOKEN TYPES

(71) Applicant: Capital One Services, LLC, McLean, VA (US)

(72) Inventors: Lawrence Douglas, McLean, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 649 days.

(21) Appl. No.: 17/933,964

(22) Filed: Sep. 21, 2022

(65) Prior Publication Data

US 2024/0097804 A1    Mar. 21, 2024

(51) Int. Cl.
*H04B 17/318* (2015.01)
*H04B 17/373* (2015.01)
*H04B 17/391* (2015.01)

(52) U.S. Cl.
CPC .................. *H04B 17/318* (2015.01)

(58) Field of Classification Search
None
See application file for complete search history.

(56) References Cited

U.S. PATENT DOCUMENTS

| | | | | |
|---|---|---|---|---|
| 11,074,642 | B2* | 7/2021 | Mehrhoff | G06Q 30/0639 |
| 11,302,448 | B1* | 4/2022 | Jain | G16H 10/60 |
| 12,125,065 | B2* | 10/2024 | Wright | G06Q 30/0261 |
| 2009/0321510 | A1* | 12/2009 | Day | G06K 7/10386 |
| | | | | 235/375 |
| 2018/0109928 | A1* | 4/2018 | Walden | H04B 17/27 |
| 2020/0285464 | A1* | 9/2020 | Brebner | G06F 8/36 |

FOREIGN PATENT DOCUMENTS

| | | | | |
|---|---|---|---|---|
| CN | 107735786 A | * | 2/2018 | ........ G06F 16/435 |
| WO | WO-2006092620 A1 | * | 9/2006 | ........ G06F 9/453 |
| WO | WO-2015183699 A1 | * | 12/2015 | ........ G06F 40/279 |

* cited by examiner

*Primary Examiner* — Mohammed Rachedine
(74) *Attorney, Agent, or Firm* — Foley & Lardner LLP

(57) ABSTRACT

In some embodiments, a system may obtain first feedback indicating one or more first signal-strength-related results corresponding with one or more first token interactions occurring in connection with presentation of one or more first components at one or more first locations of a user interface of a user device. Based on the first feedback, the system may obtain one or more second locations of the user interface and cause presentation of one or more second components at the one or more second locations of the user interface. The system may obtain second feedback indicating one or more second signal-strength-related results corresponding with one or more second token interactions. Using the first and second feedback, the system may update a user interface presentation location at which to present a component for a token interaction within a profile associated with a user of the user device.

18 Claims, 5 Drawing Sheets

SYSTEMS AND METHODS FOR FACILITATING WIRELESS TOKEN INTERACTIONS ACROSS MULTIPLE DEVICE TYPES AND/OR TOKEN TYPES

BACKGROUND

The wide variety of available token and device types causes technical problems when a user attempts to connect a specific token with a specific device. These problems result in a poor user experience and inefficient or ineffective information transfer between the token and the device. As an example, a token can be implemented within an identification badge for wirelessly authorizing a user to open a door using a token reader device. The user may get frustrated if the token does not connect with the token reader device when the user positions the token near the token reader device. As a further example, when a user is unfamiliar with or infrequently uses a specific token with a specific device, or the user has multiple different tokens for use with one or more different devices, the user's expectation for connecting the tokens and devices may be incorrect due to variations between the tokens and devices, resulting in a poor user experience and technical problems for connecting the tokens and devices.

SUMMARY

Because there is such variety in token and device types, the user's expectation for how to facilitate interaction between the token the device may be inaccurate, thereby preventing or reducing the chance for proper interaction between the token and the device. Given the differences between different types of tokens and devices, the user may be uncertain how to facilitate interaction between the token (e.g., a badge, a card, or another suitable token) and the device (e.g., an access device, a card reader device, or another suitable device), such as how to align the badge or card with the device to achieve proper interaction therebetween.

In view of the aforementioned problems, systems and methods are described herein for improving wireless token interactions across one or more device types and token types. As one example, methods and systems described herein may generate dynamic components for display on a device based on a device type of the device and a token type of a token. These components may instruct or assist the user to properly facilitate interaction between the device and token. For example, when the user attempts to use a token with a token reader device to facilitate wireless payment, components generated for display on the token reader device may instruct the user where to position the token relative to the token reader device and how to orient the token in that position.

As a further example, when the user attempts to use the token with the device, the systems and methods described may obtain a profile associated with the user or other users. The profile may include information regarding previous interactions between same or similar token types and device types. Specifically, the information may include results from previous interactions between same or similar token types and device types at known locations of the device. The systems and methods described may use this information to generate the component for display on the device at a location that is known to or predicted to achieve results satisfying a certain threshold between the token and the device. When the user uses the token with the device at the position displayed in the generated component, the systems and methods described may record the achieved results and update the profile for improving future component generation when the user's or other users' request is related to the same or similar token types and device types.

As another further example, when the user attempts to use the token with the device, the systems and methods described may obtain a profile, including information associated with the token type of the token, the device type of the device, and the user. The profile may further include information regarding regions (e.g., locations) on a display of the device, the region information including results of previous interactions between same or similar token and device types at each region. The systems and methods described may use the previous interactions from each region to identify one or more regions to generate for display a component where, when the user places the token at the component displayed on the device, the interaction is likely to achieve a result satisfying a certain threshold. Further, if the profile contains certain user information, the systems and methods described may adjust the identified regions to best suit the user's previous interactions between the same or similar tokens and devices. When the user places the token at the component displayed on the device, the systems and methods described may record the results of the interaction and update the profiles for improving future component generation when the user or other users' request is related to the same or similar token types and device types.

Various other aspects, features, and advantages of the systems and methods described herein will be apparent through the detailed description and the drawings attached hereto. It is also to be understood that both the foregoing general description and the following detailed description are examples and not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or," unless the context clearly dictates otherwise, and includes one, less than all, or all items in the list or phrase.

DETAILED DESCRIPTION

In the following description, for the purposes of explanation, numerous specific details are set forth in order to provide a thorough understanding of the embodiments of the systems and methods described herein. It will be appreciated, however, by those having skill in the art that the embodiments may be practiced without these specific details or with an equivalent arrangement. In other cases, wellknown structures and devices are shown in block diagram form in order to avoid unnecessarily obscuring the embodiments.

Figure 1:
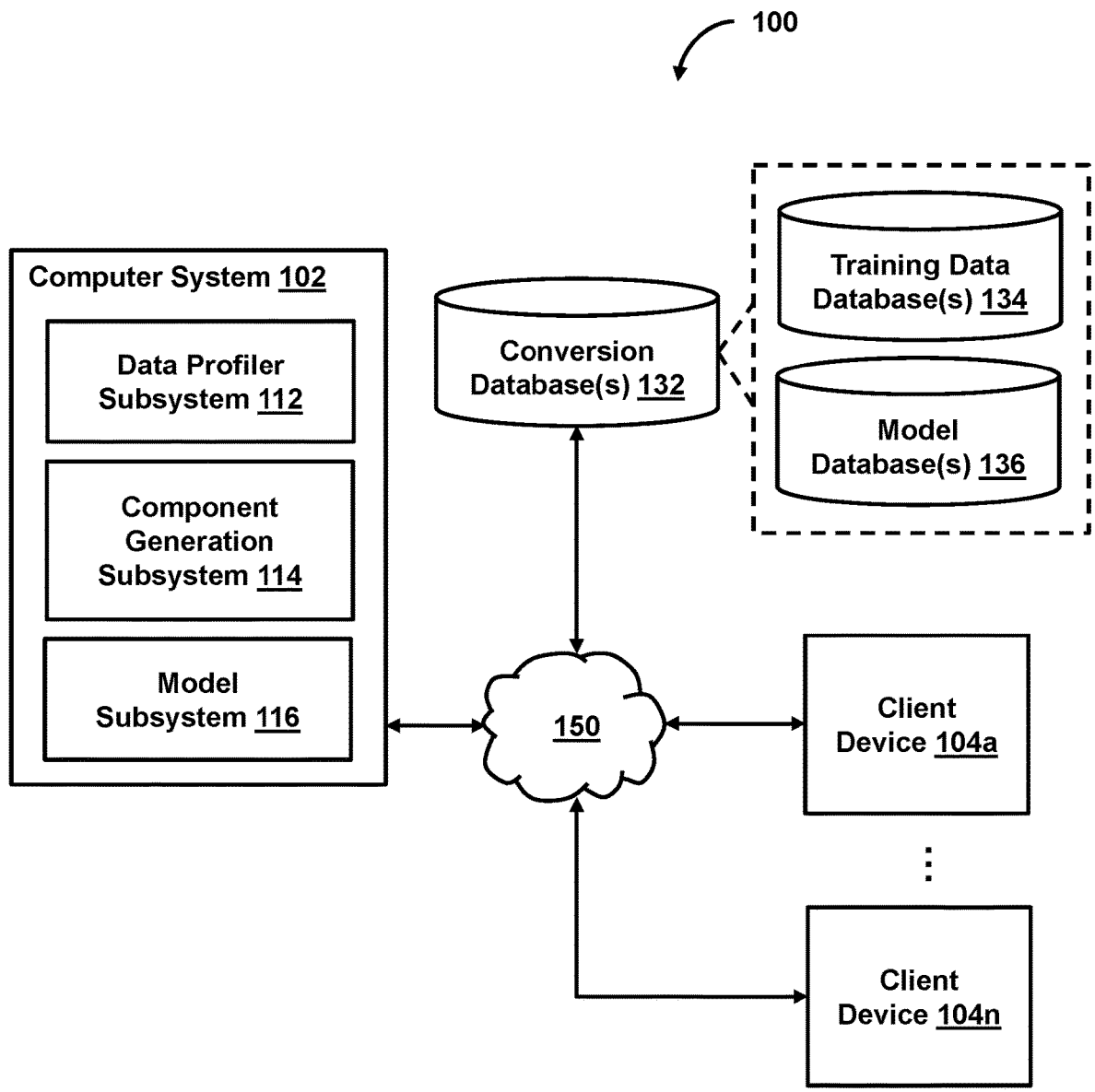
FIG. 1 shows a system for facilitating wireless token interactions, in accordance with one or more embodiments.

FIG. 1 shows a system 100 for facilitating wireless token interactions, in accordance with one or more embodiments. As shown in FIG. 1, system 100 may include computer system 102, client device 104 (or client devices 104a-104n), or other components. Computer system 102 may include data profiler subsystem 112, component generation subsystem 114, model subsystem 116, or other components. Each client device 104 may include any type of mobile terminal, fixed terminal, handheld, stationary, or other device. By way of example, client device 104 may include a desktop computer, a notebook computer, a tablet computer, a point-of-sale device, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, the system 100 may obtain a profile including a device type and a token type to generate a component for display on a client device 104, the client device 104 corresponding with the device type. The generated component may identify a location for a token to interact with the client device 104, the token corresponding with the token type. When the token and the client device 104 interact at the generated component, the system 100 may record feedback indicating results between the token and the client device 104 and associate the feedback and results with the location of the generated component. The system 100 may update the profile based on the feedback and results associated with the location of the generated component to improve future generated components. Further, the system 100 may use the feedback and results associated to predict where to generate components for display (i) on different device types used with the token type, (ii) on different device types used with different token types, or (iii) on the client device 104 used with different token types.

As a first example, the profile may correspond with a user of financial services (the "user"), such as a consumer using banking financial services, a retailer using payment processing financial services, a financial services provider facilitating the provision of financial services, or any similar user of financial services. The device type included with the profile may correspond with one or more client devices 104 the user has, such as, for example, the user's cell phone having a token reader (e.g., contactless Europay, Mastercard, and Visa ("EMV") support). The token type may correspond with one or more transaction cards of the user, such as a primary transaction card having contactless EMV support.

As a second example, the profile may instead correspond with a client device 104 used to perform or facilitate financial services and the information stored in the profile, as disclosed, is associated with any or all users of the client device 104. In these embodiments, the device type included with the profile corresponds with the client device 104 and the token type may correspond with one or more transaction cards of a user interacting with the client device 104.

As a further example, the user may access the system 100 on the user's cell phone to use the user's transaction card with the cell phone. When the user prompts (e.g., makes a request), the system 100 that the user wishes to use the transaction card with the cell phone, the system 100 may obtain the profile to identify the device type of the user's cell phone and the token type of the user's transaction card. The system 100 may use the device type and the token type to generate a component (e.g., icon) for display (e.g., presentation) on the user's cell phone display (e.g., interface) identifying a location for where to use the transaction card with the cell phone. If the transaction card and the cell phone have previously interacted either via the user or a different user with a different profile, the system 100 may use the previous interactions to, for example, generate the component for display at a location that is known to generate, or predicted by the system 100 to likely generate, a signal strength between the transaction card and the cell phone satisfying a certain threshold.

As a further example still, the user may access the system 100 on a public device (e.g., a computer, a point-of-sale device, etc.) to use the user's transaction card with the public device. When the user prompts (e.g., makes a request) the system 100 that the user wishes to use the transaction card with the public device, the system 100 may obtain the profile to identify the device type of the public device and the token type of the user's transaction card. The system 100 may use the device type and the token type to generate a component (e.g., icon) for display (e.g., presentation) on the public device's display (e.g., interface) identifying a location for where to use the transaction card with the public device. If the transaction card and the public device have previously interacted either via the user or a different user with a different transaction card, the system 100 may use the previous interactions to, for example, generate the component for display at a location that is known to generate, or predicted by the system 100 to likely generate, a signal strength between the transaction card and the public device satisfying a certain threshold.

If the transaction card and the cell phone or the public device have previously interacted but, based on the previous interaction, the system 100 identifies multiple or inconsistent component display locations satisfying the certain threshold, the system 100 may generate a component for display that moves between multiple locations on the display or moves in a circular or similar pattern between or around one or more locations on the display likely to generate a signal strength satisfying the certain threshold. As a further example still, if the transaction card and the cell phone or the public device have previously interacted but, based on the previous interaction, the system 100 identifies that the certain threshold is met when the component is generated at a location offset from a location that is known to or predicted by the system 100 to satisfy the certain threshold based on the interactions of other users, the system 100 may generate the component for display at a location offset from the location where other users are likely to generate a signal strength satisfying the certain threshold.

If the user has not previously used the transaction card and the cell phone or the public device together, the system 100 may predict a location likely to generate a signal strength satisfying the certain threshold or a location common among client devices 104, generally, for generating a signal strength satisfying the certain threshold. The system 100 may predict the location using the profile, profiles of other users, profiles of the device type, or other data comprised by the system 100. In some scenarios, the system 100 may generate for display test components based on the predicted location or at random.

Once the generated component (or the test component) is displayed, the user may position the transaction card near or on the display of the cell phone or the public device as identified by the component, allowing the transaction card and the cell phone or the public device to interact via contactless EMV, short-range radio frequency, or other similar wireless connection, and to exchange information. When the transaction card and the cell phone or the public device interact, the system 100 may record feedback indicating a result, such as, for example, a presence of a wireless connection, a signal strength, an information exchange rate, an information exchange efficiency, an interaction timeframe, or similar feedback information, between the transaction card and the cell phone or the public device at the location of the generated component. The system 100 may update the profile based on the feedback. When presenting a test component, the system 100 may generate or display one or more test components alone or in sequence, updating the profile based on feedback from each test component, and utilizing the updated profile for generating subsequent test components.

In some embodiments, when the user accesses the system 100 on the user's cell phone or the public device, the cell phone or the public device may locally perform one, multiple, or all of the following operations identified above and further disclosed below: (i) obtaining the profile, (ii) identifying or predicting a location of the display to present the component, (iii) incorporating, when available, previous interaction information, motion assistance, or offset assistance, (iv) generating the component for display, (v) recording the feedback from the token interaction, or (vi) updating the profile based on the feedback. The cell phone or the public device may similarly locally perform any additional operation supporting these operations. In some embodiments, when the user accesses the system 100 on the user's cell phone or the public device, the computer system 102 may instead perform or assist the user's cell phone or the public device to perform one, multiple, or all of the above operations. For example, the cell phone or the public device may locally obtain feedback from a first token interaction, identify one or more locations for displaying one or more second components based on the first feedback, generate and display the components at the one or more second locations, obtain second feedback from token interactions at the one or more second locations, and update the profile based on the first and second feedback.

Therefore, when any user of the system 100 wishes to use a certain device type with a certain token type, whether or not the user has used the certain device type with the certain token type before, the user can be prompted with a generated component identifying a location on the display of the client device 104 likely to achieve, for example, a signal strength satisfying the certain threshold between the certain device type and the certain token type. Further, even if the user has used the certain device type and the certain token type together but is unable to consistently achieve, for example, a signal strength satisfying the certain threshold, the system 100 may compensate for this issue and animate or move the display location of the generated component to better allow the user to satisfy the certain threshold. Accordingly, regardless of the user's previous experience with any device type or any token type, the system 100 allows the user to have the highest likelihood of achieving, for example, a signal strength satisfying the certain threshold, alleviating poor user experiences and technical problems associated with ineffective device and token interaction.

Subsystems 112-116

In some embodiments, the data profiler subsystem 112 may obtain or update a profile associated with the user. The profile may include one or more client devices 104, one or more tokens, one or more user attributes, one or more guidance profiles, or other similar information associated with the user. The included one or more client devices 104 may correspond with a device owned, used, or interacted with by the user. Each client device 104 included in the profile may have a device type. The device type may include, for example, device identification information such as a device manufacturer, a device model number, a device operating system, a device category (e.g., computer, tablet, cell phone, consumer-facing point-of-sale, retailer-facing point-of-sale), or other similar device identifying information. The device type may further include contactless EMV support information (e.g., yes, no), device dimensions (e.g., display location, display size), a token reader information (e.g., a receiver location relative to the display, a receiver signal range, or similar receiver information), or other similar device information. The information included with the device type may be based on a dataset of known device information from the system 100, may be received from the client device 104 upon interface with the system 100, or may be derived by the system 100 through interfaces with multiples client devices 104 over time.

The included one or more tokens may correspond with a token owned, used, or interacted with by the user such as, for example, a transaction card with an antenna supporting contactless EMV or other similar devices supporting wireless communication with the client device 104. Each token included in the profile may have a token type. The token type may include, for example, transaction card identification information such as a transaction card number, a user account identifier, a card type identifier, or other similar card identifying information. The token type may further include a card material (e.g., metal, plastic, or a specific species thereof), card dimensions (e.g., thickness, height, or width), contactless EMV support (e.g., yes, no), token identifying information, transmitting antenna properties (e.g., antenna length, antenna location), contactless EMV properties (e.g., minimum required signal strength), or other similar token information. The information included with the token type may be based on a dataset of known token information from the system 100, may be received from the token upon interface with the system 100, or may be derived by the system 100 through interfaces with multiple tokens over time. As an example, the system 100 may use visual recognition technology to identify token type information from images collected by the client device 104 of the token before, during, or after an interaction between the token and the client device 104.

The included one or more user attributes may correspond with the user the profile is associated with. The user attributes may include a user precision or similar user information. The user precision may include information identifying a user's consistency for satisfying the certain threshold signal strength between a token and a client device 104 from the profile, the certain threshold signal strength being associated with the relevant token type, client device type, or locations on the client device 104. The user precision may further include assistance information such as, for example, a motion assistance, an offset assistance, or similar assistance information. The motion assistance information may identify, for example, that the user achieves the certain threshold when the generated component moves on the display of the client device 104 between locations or around a specific location. The offset assistance information may identify, for example, that the user achieves the certain threshold when the generated component is displayed on the client device 104 offset in a specified direction and distance from the component location known or predicted by the system 100 to satisfy the certain threshold.

Figure 2:
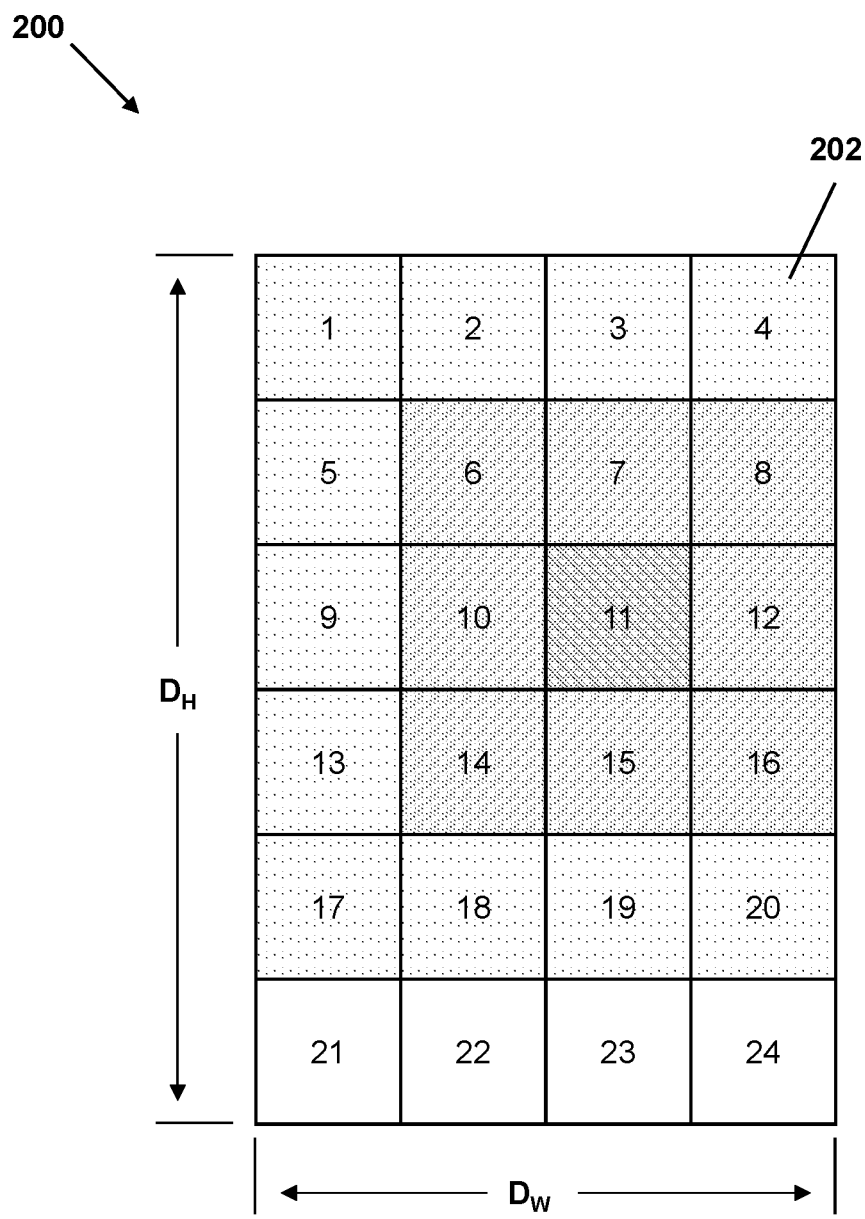
FIG. 2 shows a depiction of a guidance profile, in accordance with one or more embodiments.

The included one or more guidance profiles may be associated with a combination of one or more client devices 104 and one or more tokens included in the profile. As an example, a guidance profile may visually correspond with the guidance profile 200 of FIG. 2. The guidance profile 200 may correspond in shape with the display of the associated the client devices 104. For example, the guidance profile 200 may be a rectangle corresponding in height ($D_H$) and width ($D_W$) with the height and width of the display of the client devices 104. The guidance profile 200 may include the certain threshold results, such as, for example, a signal strength that is known to or predicted by the system 100 as a necessary signal strength to achieve information exchange between the client devices 104 and the tokens, at certain locations of the client devices 104. These locations may correspond with regions 202 of the guidance profile 200. As illustrated, the guidance profile 200 includes twenty-four regions 202, however, the guidance profile may include more or fewer regions 202.

Specifically, the certain threshold results may be included with each region 202. In some embodiments, the certain threshold may include a signal strength identified by the system 100 over time as sufficient to facilitate information exchange between interacting client devices 104 and tokens. Additionally or alternatively, the regions 202 may include interaction information for the associated client devices 104 and tokens. The interaction information between the client devices 104 and the tokens may include historic interaction information such as, for example, historic interaction signal strengths, an average interaction signal strength, interaction signal strengths that are known by the system 100, or similar historic interaction information.

The interaction information may further include interaction prediction information. The interaction prediction information may include a probability prediction, a set of likely regions 202, or similar prediction information based on the historic interaction information. The probability prediction information may include the likelihood that displaying the generating component at the location of the client device 104 corresponding with the region 202 will produce a signal strength satisfying the certain threshold. As an example, the probability prediction information may be visualized similar to the shading or "heatmap" overlay of FIG. 2, where the darker the region 202 is, the higher the probability the region 202 will produce a signal strength satisfying the certain threshold.

The set of likely regions 202 may include a set of regions 202 identified as likely to produce a signal strength satisfying the certain threshold and a confidence score associated with achieving the certain threshold for each region 202 of the set. As an example, the set of likely regions 202 may similarly be visualized like the shading overlay of FIG. 2, where regions 202 with any sharing are included within the set of likely regions 202, and the darker the region 202 is shaded, the higher the confidence score associated with that region 202 is.

Figure 3A:
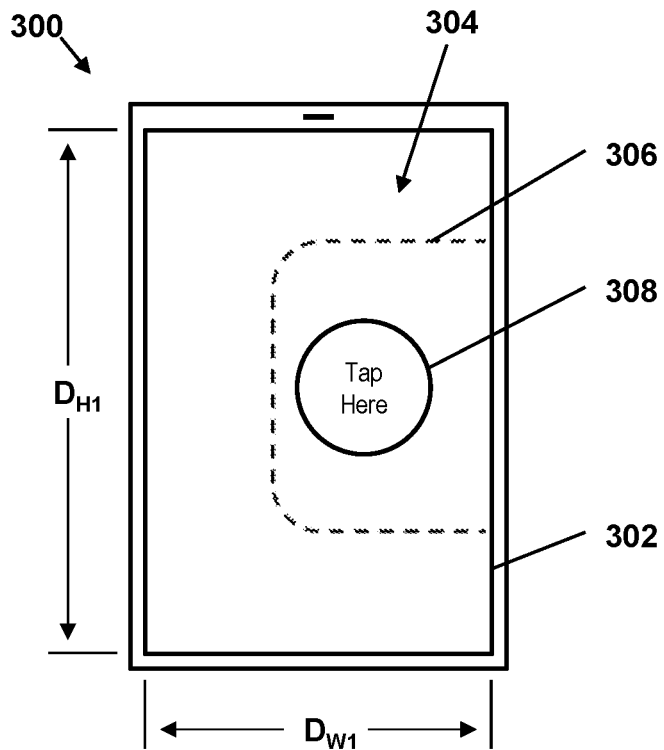
FIGS. 3A-3B show depictions of a component presented on a device, in accordance with one or more embodiments.
Figure 3B:
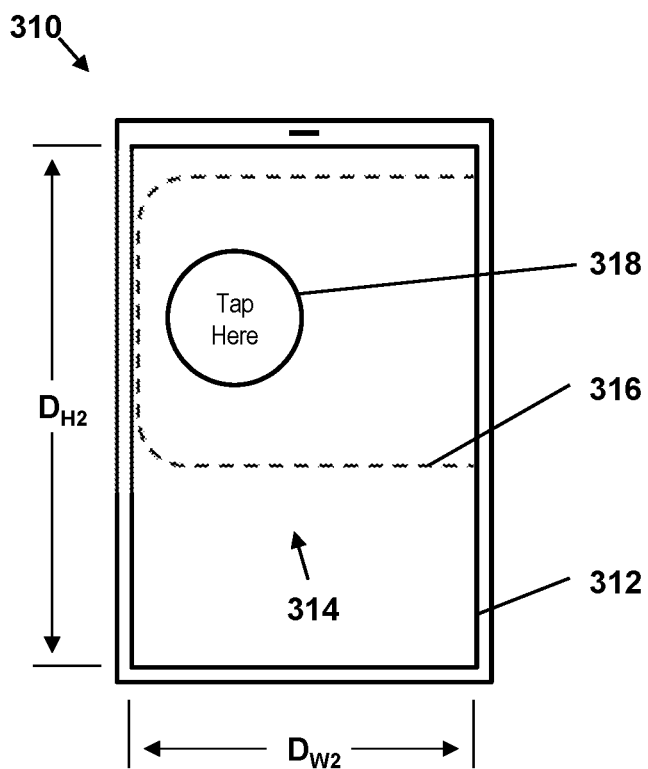

In some embodiments, in response to a user request to use a token with a client device 104, the component generation subsystem 114 may use the profile obtained by the data profiler subsystem 112 to generate a component for display on the client device 104. FIGS. 3A and 3B (collectively, "FIG. 3") are two examples of a component 304, 314 generated on client devices 300, 310 using the profile in response to the user request. As shown, the client devices 300, 310 are cell phones. The client devices 300, 310 may both have a first device type, or the client device 300 may have the first device type and the client device 310 may have a second device type. The client devices 300, 310 have displays 302, 312. The display 302 has a first device height ($D_{H1}$) and width ($D_{W1}$), and the display 312 has a second device height ($D_{H2}$) and width ($D_{W2}$). The first device height or width may be the same as or different than the second device height or width, respectively. The client devices 300, 310 are shown as cell phones for ease of description. One of ordinary skill in the art would appreciate, however, that the client devices 300, 310 are illustrative of any client device 104 disclosed.

The components 304, 314 may be a displayed icon including a token outline 306, 316 or a token target 308, 318. The token outline 306, 316 may include a dashed or solid line, a shading or shadow, an image, or any other similar illustration representing, for example, the outline or orientation of the token associated with the token presented on the display 302, 312. The token outline 306, 316 may be based on the token type of the token associated with the user request. For example, the token outline 306, 316 may be based on information that is known by the system 100 regarding the token type identifier, the token material, the token dimensions, the transmitting antenna properties, or other similar token information.

The token target 308, 318 may include an image or text within the token outline 306, 316 instructing the user to tap or place the token near or on the display 302, 312 to use the token with the client device 300, 310. For example, the token target 308, 318 may include the words "Tap Here" within a circle on the center-left of the token outline 306, 316, as shown in FIG. 3. As a further example, the token target 308, 318 may include the image of a target (e.g., bullseye) or the token target 308, 318 may include the words "Tap Card Here," alone, within the token outline 306, 316. Additionally or alternatively, the token target 308, 318 may be based on the token type of the token associated with the user request. As an example, the token target 308, 318 may be based on information that is known by the system 100 regarding the token number, a user account identifier, or other similar token identifying information. The component generation subsystem 114 may use this token identifying information to include, for example, the token number or the user account information as the token target 308, 318, making the component 304, 314 replicate the appearance of the token.

In some embodiments, the components 304, 314 may correspond with the shape or dimensions of the display 302, 312. For example, the token outline 306, 316 may include a dashed or solid line, a shading or shadow, an image, or any other similar illustration highlighting or identifying a certain area of the display 302, 312 (e.g., a dashed line down the center of the display, a box around a top right quadrant of the display, etc.) regardless of the token. Further, the token target 308, 318 may include the words "Place card anywhere to the right of the dashed line," or similar, when the token outline 306, 316 is a dashed line displayed vertically from the top to the bottom of the display 302, 312, or similarly displayed corresponding to the dimensions of the display 302, 312.

In the example of FIG. 3A, when the user requests to use the token with the client device 300, the component generation subsystem 114 may obtain the profile associated with the token type of the token and the first device type. The component generation subsystem 114 may use the guidance profile of the obtained profile to identify the location of the display 302 to present the generated component 304 relative to the center of the display 302 or other device dimensions. The component generation subsystem 114 may also use the token type and the first device type to identify how to display the generated component 304 relative to the identified location. When the token and the client device 300 interact where the generated component 304 is displayed, the system 100 may record feedback, such as the signal strength, between the token and the client device 300 and the system 100 may prompt the data profiler subsystem 112 to update the profile based on the feedback. For example, the data profiler subsystem 112 may update the guidance profile and the included interaction information.

FIG. 3B is an example of the same process when the user requests to use the token with the client device 310, including the second device type. FIG. 3B is a further example of the same process when the user requests to use a token with a different token type with the client device 310, including the first device type. In ether scenarios, the component generation subsystem 114 may obtain the profile associated with the relevant token type and the first or second device type. The component generation subsystem 114 may use the guidance profile of the profile to identify the location of the display 312 to present the generated component 314, relative to the center of the display 312 or other device dimensions. The component generation subsystem 114 may also use the relevant token type and the first or second device type to identify how to generate the component 314 relative to the identified location. When the token and the client device 310 interact where the generate component 314 is displayed, the system 100 may record the signal strength or other information between the token and the client device 310, and the system 100 may prompt the data profiler subsystem 112 to update the profile based on the recorded signal strength. As illustrated by FIG. 3B, the different token and device types cause the component generation subsystem 114 to display the generated component 314 at a different location on the display 312 than on the display 302. The component 314 was generated at a different location relative to the display 302 because, based on the token type and device type combination, the component generation subsystem 114 identified the different location had a higher likelihood for achieving a signal strength between the token and the client device 310 at the different location.

To identify the location of the displays 302, 312 to display the generated components 304, 314, the component generation subsystem 114 may use the interaction information from the guidance profiles associated with the device types and the token types. In this scenario, the height and width of the obtained guidance profile (e.g., $D_H$ and $D_W$ of FIG. 2) may correspond with the height ($D_{H1}$, $D_{H1}$) and width ($D_{W1}$, $D_{W2}$) of the displays 302, 312. Each region 202 of the guidance profiles, and the information associated with each region 202, may correspond with a location on the displays 302, 312. The component generation subsystem 114 may use the historic interaction information or the interaction prediction information corresponding with regions 202 to identify a location on the displays 302, 312 most likely to produce a signal strength satisfying the certain threshold. Further, the component generation subsystem 114 may adjust the location of the component 304, 314 if the profile contains user precision information.

When using the historic interaction information, the component generation subsystem 114 may identify the location of the displays 302, 312 associated with the region 202 with the highest average signal strength, the highest signal strength known by the system 100, or any other metric identifying the region 202 likely to satisfy the certain threshold based on the historic interaction information. When using the interaction prediction information, the component generation subsystem 114 may identify the location of the displays 302, 312 associated with the region 202 with the (i) highest probability, or the (ii) highest confidence of achieving the certain threshold.

When the profile contains user precision information, such as motion assistance or offset assistance, the component generation subsystem 114 may adjust the identified location of the displays 302, 312 based on the motion assistance or offset assistance. For example, once the location is identified, the component generation subsystem 114 may generate a moving location around the identified location or, if the user precision is low, a moving location between multiple identified locations based on the motion assistance information. As a further example, once the location is identified, the component generation subsystem 114 may adjust the identified location a certain offset distance based on the offset assistance information.

Once the component generation subsystem 114 has identified the location of the displays 302, 312 and the movement around or between, or the offset therefrom, the component generation subsystem 114 may identify how to display the components 304, 314 relative to the identified location. The component generation subsystem 114 may use the token type and the device type to identify how to display the components 304, 314 relative to the identified location. For example, the component generation subsystem 114 may use the device dimensions, the token reader information, or other similar device information from the device types in combination with the token material, token dimensions, transmitting antenna properties, contactless EMV properties, or other similar token information from the token types. The component generation subsystem 114 may use this information to generate the components 304, 314 on the display such that the user places the token on the client devices 300, 310 with the token nearest to the token reader of the client devices 300, 310, with the interaction between the token and the client device 300, 310 achieving the highest signal strength, or with the highest likelihood that the interaction between the token and the client devices 300, 310 will achieve a signal strength satisfying the certain threshold.

When the user uses the token with the client device 300, 310 at the components 304, 314 on the displays 302, 312, the system 100 may record the signal strength between the token and the client devices 300, 310. The system 100 may prompt the data profiler subsystem 112 to update the profiles based on the recorded signal strength. The data profiler subsystem 112 may store the recorded signal strength and update the guidance profiles, and the historic interaction information and the interaction prediction information included therein.

Further, the data profiler subsystem 112 may update the user precision or assistance information.

In some embodiments, model subsystem 116 may train or configure one or more prediction models to facilitate one or more embodiments described herein. In some embodiments, such models may be used to perform data format detection and conversion, speech recognition, word space mapping, or language translation. As an example, such models may be trained or configured to perform the foregoing functions by respectively mutually mapping input data and output data in nonlinear relationships based on learning (e.g., deep learning).

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 4:
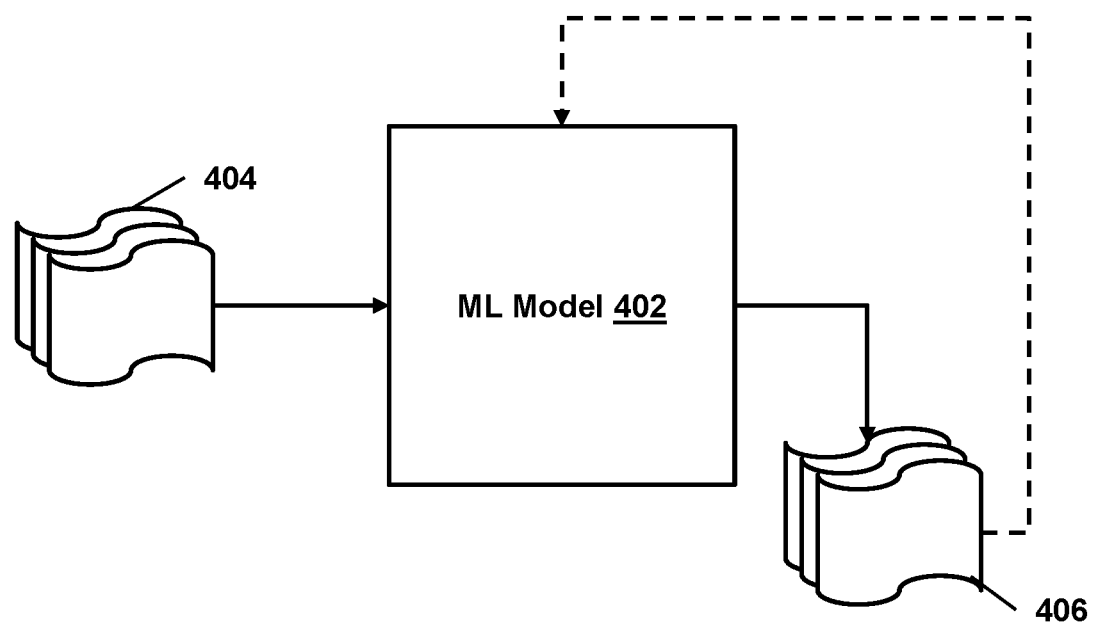
FIG. 4 shows a machine learning model configured to facilitating wireless token interactions, in accordance with one or more embodiments.

As an example, with respect to FIG. 4, machine learning model 402 may take inputs 404, such as, for example, a ground truth, and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers, other than the output layer, are connected to nodes of a subsequent layer through links for transmitting output signals or information from the current layer to the subsequent layer, for example. The number of the links may correspond to the number of the nodes included in the subsequent layer. For example, in adjacent fully-connected layers, each node of a current layer may have a respective link to each node of the subsequent layer, noting that in some examples, such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

Example Flowcharts

Figure 5:
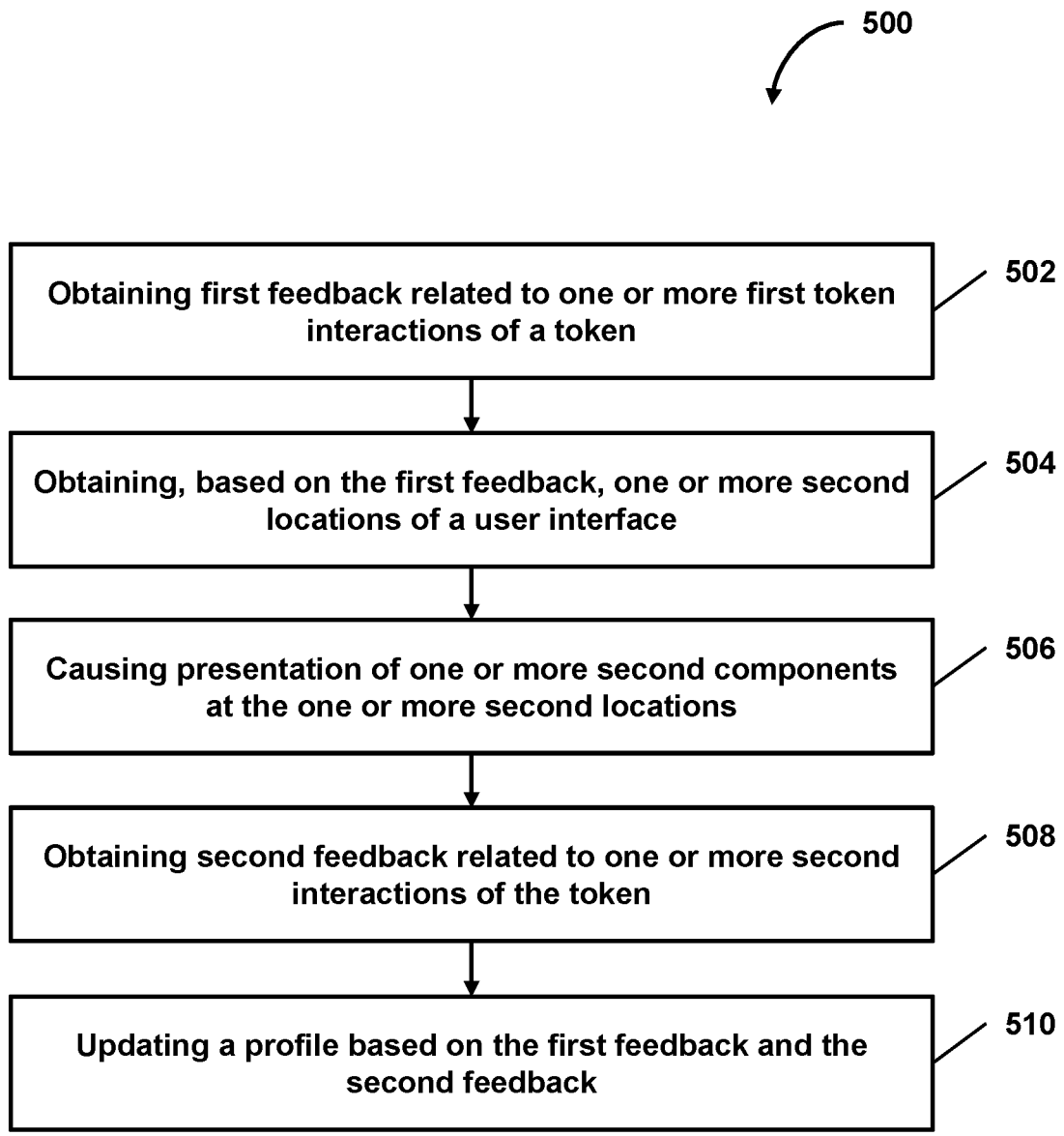
FIG. 5 shows a flowchart of a method of improving signal strength of wireless token interactions, in accordance with one or more embodiments.

FIG. 5 is an example flowchart of processing operations of a method 500 that enable the various features and functionality of the system as described in detail above. The processing operations of the method presented below are intended to be illustrative and non-limiting. In some embodiments, for example, the method may be accomplished with one or more additional operations not described, or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

In an operation 502, a first feedback related to one or more first token interactions of a token may be obtained. For example, the one or more token interactions may occur in connection with presentation of one or more first components at one or more first locations of a user interface of a user device and the token interacting with the user device at the one or more first locations. The first feedback may indicate one or more first signal-strength-related results corresponding to the one or more first token interactions. Operation 502 may be performed by a subsystem that is the same as or similar to the subsystem 112, in accordance with one or more embodiments.

In an operation 504, one or more second locations of a user interface may be obtained based on the first feedback. For example, based on the one or more first signal-strength-related results corresponding to the one or more first token interactions, the one or more second locations may be obtained and have a predicted or known likelihood of producing one or more second signal-strength-related results when one or more second token interactions of a token occur at the one or more second locations. Operation 504 may be performed by and include information from a subsystem that is the same as or similar to the data profiler subsystem 112, in accordance with one or more embodiments.

In an operation 506, one or more second components may be presented at the one or more second locations. For example, a first one of the one or more second components may be presented at a first one of the one or more second locations, and a second one of the one or more second components may be presented at a second one of the one or more second locations. Additionally or alternatively, the first one of the one or more second components may be simultaneously or subsequently presented at the second one of the one or more second locations. Operation 506 may be performed by a subsystem that is the same as or similar to the component generation subsystem 114, in accordance with one or more embodiments.

In an operation 508, a second feedback related to one or more second interactions of the token may be obtained. For example, one or more second token interactions may occur in connection with presentation of the one or more second components at the one or more second locations of the user interface of the user device and interacting the token with the user device at the one or more second locations. The second feedback may indicate one or more second signal-strength-related results corresponding to the one or more first token interactions. Operation 508 may be performed by a subsystem that is the same as or similar to the subsystem 112, in accordance with one or more embodiments.

In an operation 510, a profile may be updated based on the first feedback and the second feedback. For example, the profile may be associated with one or more users of the user device and include information about one or more tokens and one or more user devices. Specifically, the profile may include a location of the user interface at which to present a future component for a future token interaction. The location may be associated with one or more specific tokens and one or more specific user devices. When the profile is updated, the first feedback and the second feedback may be added to or replace information within the profile. Further, the first feedback and the second feedback may be used to modify existing information within the profile. For example, the first feedback and the second feedback may be added to or replace interaction information included in the guidance profile, including adding to or replacing the historic interaction information. Additionally or alternatively, the first feedback and the second feedback may be used to update the interaction prediction information. Operation 510 may be performed by a subsystem that is the same as or similar to the subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., conversion database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although the systems and methods have been described herein in detail for the purpose of illustration based on what are currently considered to be the most practical and preferred embodiments, it is to be understood that such detail is solely for that purpose and that the systems and methods are not limited to the disclosed embodiments, but, on the contrary, are intended to cover modifications and equivalent arrangements that are within the scope of the appended claims. For example, it is to be understood that the systems and methods described herein contemplate that, to the extent possible, one or more features of any embodiment can be combined with one or more features of any other embodiment.

The present techniques will be better understood with reference to the following enumerated embodiments:

A1. A method comprising: obtaining first feedback related to one or more first token interactions of a token that occurred in connection with presentation of one or more first components at one or more first locations of a user interface of a user device, the first feedback indicating one or more first results corresponding to the one or more first token interactions; obtaining, based on the first feedback, one or more second locations of the user interface; causing presentation of one or more second components at the one or more second locations of the user interface; obtaining second feedback related to one or more second token interactions of the token that occurred in connection with the presentation of the one or more second components, the second feedback indicating one or more second results corresponding to the one or more second token interactions; and updating a profile associated with a user based on the first feedback and the second feedback, the profile indicating a location of the user interface at which to present a component for a token interaction.

A2. The method of the preceding embodiment, wherein the one or more first results comprises one or more first signal strength values corresponding to the one or more first token interactions.

A3. The method of any of the preceding embodiments of A1-A2, wherein the one or more second locations are locations of the user interface at which presentation of components are predicted to evoke token interactions that satisfy a signal strength threshold.

A4. The method of any of the preceding embodiments of A1-A3, wherein the one or more first token interactions comprises a wireless connection between the token and the user device.

A5. The method of any of the preceding embodiments of A1-A4, wherein the token comprises a transmitting antenna.

A6. The method of any of the preceding embodiments of A1-A5, wherein the token comprises a transaction card.

A7. The method of any of the preceding embodiments of A1-A6, wherein the user interface of the user device includes a display.

A8. The method of the preceding embodiment, wherein the presentation of the one or more first components comprises showing the one or more first components on the display.

A9. The method of any of the preceding embodiments of A1-A8, wherein the user device comprises a user handheld device.

A10. The method of any of the preceding embodiments of A1-A8, wherein the user device comprises a stationary user device.

A11. The method of any of the preceding embodiments of A1-A8, wherein the user device comprises a desktop computer, a notebook computer, a tablet computer, a point-of-sale device, a smartphone, or a wearable device.

A12. The method of any of the preceding embodiments of A1-A11, wherein the one or more first components or the one or more second components comprise one or more icons.

A13. The method of any of the preceding embodiments of A1-A12, wherein the one or more first components or the one or more second components comprises a token outline.

A14. The method of the preceding embodiment, wherein the token outline comprises an illustration representing an outline of the token.

A15. The method of embodiment A13, wherein the token outline comprises an illustration representing an orientation of the token relative to the user device.

A16. The method of any of the preceding embodiments of A1-A15, wherein the one or more first components or the one or more second components comprises a token target.

A17. The method of the preceding embodiment, wherein the token target comprises instructions for the user to interact the token with the user device at the token target.

A18. The method of embodiment A16, wherein the token target comprises written instructions for the user to interact the token with the user device at the token target.

A19. The method of embodiment A16, wherein the token target comprises visual instructions for the user to interact the token with the user device at the token target.

A20. The method of any of the preceding embodiments of A1-A19, wherein the profile includes one or more user attributes or one or more guidance profiles.

A21. The method of embodiment 20, wherein the one or more user devices each includes a device type.

A22. The method of embodiment 20, wherein the one or more tokens each includes a token type.

A23. The method of embodiment 20, wherein the one or more user attributes includes a user precision.

A24. The method of embodiment 20, wherein each of the one or more guidance profiles is associated with one or more device types and one or more token types.

A25. The method of embodiment 20, wherein the one or more guidance profiles each indicate the location to present the component based on the user device type and the token type.

A26. The method of any of the preceding embodiments of A1-A25, wherein presentation of the one or more first components at one or more first locations is based on the location indicated by the profile.

A27. The method of any of the preceding embodiments of A1-A26, wherein presentation of the one or more second components at one or more second locations is based on the location indicated by the profile and the first feedback.

A28. The method of any of the preceding embodiments of A1-A27, where obtaining the one or more second locations of the user interface includes identifying a probability that a signal strength threshold will be reached during the token interaction at each of an interface location comprised in a token interaction dataset.

A29. The method of any of the preceding embodiments A1-A27, wherein determining one or more second locations includes identifying a set of locations where the token interaction is likely to reach a signal strength threshold and associating a confidence score with each location in the set of locations.

A30. The method of any of the preceding embodiments A1-A27, wherein determining one or more second locations includes inputting the first feedback into a neural network to cause the neural network to provide the one or more second locations.

A31. The method of any of the preceding embodiments A1-30, further comprising: determining, via a prediction model, based on the first feedback, a set of offsets for a first location of the one or more first locations; and wherein obtaining the set of locations comprises determining the set of locations by offsetting the first location with the set of offsets.

A32. The method of any of the preceding embodiments A1-A31, wherein obtaining the first feedback related to the one or more first token interactions of the token includes accessing a second profile associated with a second user.

A33. The method of the preceding embodiment, wherein the second profile associated with the second user indicates a location of a second user interface at which to present the component for a second user token interaction, the second user interface being different than the user interface.

A34. The method of embodiment A32, wherein the second user interface is associated with a second user device, and wherein the second user device has different physical dimensions from the user device.

A35. The method of the preceding embodiment, wherein the second profile associated with the second user indicates a location of a second user interface at which to present the component for a second user token interaction of a second token, the second token being different than the token.

A36. The method of the preceding embodiment, wherein the token and the second token each have a transmitting antenna, and wherein the transmitting antenna of the token is in a different position than the transmitting antenna of the second token.

A37. The method of any of the preceding embodiments A1-A36, wherein the one or more first results further include a historic interaction information, the historic interaction information including historic signal-strength-related results corresponding to historic token interactions.

B1. A method comprising: obtaining a token interaction dataset comprising (i) interface location data indicating interface locations at which given interface components were presented to a set of users, and (ii) results data indicating signal-strength-related results that correspond to token interactions by the set of users in connection with the presentation of the given interface components; and determining, via one or more prediction models, based on the token interaction dataset, one or more locations at which presentation of interface components on user devices of a given device type are predicted to evoke token interactions that satisfy a signal strength threshold.

B2. The method of the preceding embodiment, wherein the token interaction dataset is associated with one or more token types.

B3. The method of any of the preceding embodiments B1-B2, wherein the token interactions include a wireless communication between the user devices and one or more tokens.

B4. The method of any of the preceding embodiments B1-B3 further comprising presenting the interface components at the one or more locations and obtaining feedback from the token interactions between the user devices and the one or more tokens at the presented interface components.

B5. The method of any of the preceding embodiments B1-B4 further comprising updating the token interaction dataset based on the feedback.

B6. The method of any of the preceding embodiments B1-B5, wherein determining one or more locations includes identifying a probability that the signal strength threshold will be reached during the token interactions at each of the interface locations comprised in the token interaction dataset.

B7. The method of any of the preceding embodiments B1-B5, wherein determining one or more locations includes identifying a set of locations where the token interactions are likely to reach the signal strength threshold and associating a confidence score with each location in the set of locations.

B8. The method of any of the preceding embodiments B1-B5, wherein determining one or more locations includes inputting the token interaction dataset into a neural network to cause the neural network to provide the one or more locations.

B9. The method of any of the preceding embodiments B1-B8, wherein the token interaction dataset further comprises interface locations where interface components have not been presented.

B10. The method of any of the preceding embodiments B1-B9, wherein obtaining a token interaction dataset further comprises: a first data subset indicating (i) interface locations at which given interface components were presented on first user devices of a first device type, and (ii) signal-strength-related results that correspond to token interactions with the first user devices in connection with the presentation of the given interface components on the first user devices; and a second data subset indicating (i) interface locations at which given interface components were presented on second user devices of a second device type, and (ii) signal-strength-related results that correspond to token interactions with the second user devices in connection with the presentation of the given interface components on the second user devices.

B11. The method of the preceding embodiment, wherein the first device type has different physical dimensions from the second device type.

B12. The method of either embodiments B10 or B11, wherein the first device type has a wireless token reader at a first position relative to a center of the first device type, and the second device type has a wireless token reader at a second position relative to a center of the second device type, the second relative position being different from the first relative position.

B13. The method of either embodiments B10 or B11, wherein the token interactions with the first user devices or the second user devices comprises respective token interactions of different token types with the first user devices or the second user devices, and wherein each token type of the different token types has a transmitting antenna at a different position from a transmitting antenna of one or more other token types of the different token types.

B14. The method of any of the preceding embodiments B1-B13, wherein the one or more prediction models are selected from a plurality of prediction models that correspond to different device types, the prediction model for obtaining the one or more locations.

B15. The method of any of the preceding embodiments B1-B14, wherein the one or more predictions models are selected, based on a token type of the token, from a plurality of prediction models that correspond to different token types, the prediction model for obtaining the one or more locations.

C1. A tangible, non-transitory, machine-readable medium storing instructions that, when executed by a data processing apparatus, cause the data processing apparatus to perform operations comprising those of any of the foregoing method embodiments.

C2. A system comprising: one or more processors; and memory storing instructions that, when executed by the processors, cause the processors to effectuate operations comprising those of any of the foregoing method embodiments.

What is claimed is:

1. A method comprising:
obtaining first feedback related to one or more first token interactions of a token that occurred in connection with presentation of one or more first interface components at one or more first locations of a user interface of a user device, the first feedback indicating one or more first signal strength values corresponding to the one or more first token interactions;
obtaining, via a prediction model, based on the first feedback (i) a set of locations of the user interface at which presentation of interface components are predicted to evoke token interactions that satisfy a signal strength threshold and (ii) a set of confidence scores associated with the set of locations;
selecting, based on the set of confidence scores, one or more locations of the set of locations that are to be tested during a test presentation, the one or more locations being selected over one or more other locations of the set of locations based on the set of confidence scores;
causing presentation of one or more second interface components at the selected locations of the user interface and obtaining second feedback related to one or more second token interactions of the token that occurred in connection with the presentation of the one or more second interface components, the second feedback indicating one or more second signal strength values corresponding to the one or more second token interactions; and
updating a profile associated with a user of the user device based on the first feedback and the second feedback, the profile indicating a location of the user interface at which to present an interface component for a token interaction.

2. The method of claim 1, further comprising:
obtaining a token interaction dataset comprising (i) interface location data indicating interface locations at which given interface components were presented to a set of users and (ii) results data indicating signal-strength-related results that correspond to token interactions by the set of users in connection with the presentation of the given interface components; and
performing configuration of the prediction model based on the token interaction dataset,
wherein the set of locations and the set of confidence scores are obtained subsequent to the configuration of the prediction model.

3. The method of claim 1, further comprising:
determining, via the prediction model, based on the first feedback, a set of offsets for a first location of the one or more first locations; and
wherein obtaining the set of locations comprises determining the set of locations by offsetting the first location with the set of offsets.

4. The method of claim 1, further comprising:
obtaining a token interaction dataset, the token interaction dataset comprising:
a first data subset indicating (i) interface locations at which given interface components were presented on first user devices of a first device type and (ii) signal-strength-related results that correspond to token interactions with the first user devices in connection with the presentation of the given interface components on the first user devices; and
a second data subset indicating (i) interface locations at which given interface components were presented on second user devices of a second device type and (ii) signal-strength-related results that correspond to token interactions with the second user devices in connection with the presentation of the given interface components on the second user devices,
wherein the first device type has different physical dimensions from the second device type;
determining, via one or more prediction models, based on the token interaction dataset, one or more common locations at which presentation of interface components on the first and second user devices are predicted to evoke token interactions that satisfy the signal strength threshold; and
causing, based on the one or more common locations, the presentation of the one or more first interface components at one or more first locations of the user interface, wherein the one or more common locations comprise the one or more first locations of the user interface.

5. The method of claim 4, wherein the first device type has a wireless token reader at a first position relative to a center of the first device type, and the second device type has a wireless token reader at a second position relative to a center of the second device type, the second relative position being different from the first relative position.

6. The method of claim 4, wherein the token interactions with the first user devices or the second user devices comprises respective token interactions of different token types with the first user devices or the second user devices, and
wherein each token type of the different token types has a transmitting antenna at a different position from a transmitting antenna of one or more other token types of the different token types.

7. The method of claim 1, further comprising:
selecting, based on a device type of the user device, from a plurality of prediction models that correspond to different device types, the prediction model for obtaining the set of locations,
wherein each device type of the different device types has different physical dimensions from one or more other device types of the different device types.

8. The method of claim 1, further comprising:
selecting, based on a token type of the token, from a plurality of prediction models that correspond to different token types, the prediction model for obtaining the set of locations,
wherein each token type of the different token types has a transmitting antenna at a different position from a transmitting antenna of one or more other token types of the different token types.

9. One or more non-transitory computer-readable media comprising instructions that, when executed by one or more processors, cause operations comprising:
obtaining first feedback related to one or more first token interactions of a token that occurred in connection with presentation of one or more first components at one or more first locations of a user interface of a user device, the first feedback indicating one or more first signal-strength-related results corresponding to the one or more first token interactions;
obtaining, based on the first feedback, one or more second locations of the user interface;

causing presentation of one or more second components at the one or more second locations of the user interface and obtaining second feedback related to one or more second token interactions of the token that occurred in connection with the presentation of the one or more second components, the second feedback indicating one or more second signal-strength-related results corresponding to the one or more second token interactions; and updating a profile associated with a user of the user device based on the first feedback and the second feedback, the profile indicating a location of the user interface at which to present a component for a token interaction.

10. The one or more non-transitory computer-readable media of claim 9, wherein the instructions further cause operations comprising:

analyzing the first feedback against a comparison feedback, the comparison feedback including one or more comparison token interactions of a comparison token that occurred in connection with presentation of one or more comparison components at the one or more first locations of the user interface of a comparison user device;

identifying one or more first feedback results less than a threshold results generated by the comparison feedback;

generating an offset based on the one or more first feedback results and the threshold results; and obtaining one or more second locations of the user interface further comprising applying the offset to the first feedback.

11. The one or more non-transitory computer-readable media of claim 9, wherein obtaining the first feedback related to the one or more first token interactions includes accessing a second profile associated with a second user.

12. The one or more non-transitory computer-readable media of claim 11, wherein the second profile associated with the second user indicates a location of a second user interface at which to present the component for a second user token interaction, the second user interface being different than the user interface.

13. The one or more non-transitory computer-readable media of claim 12, wherein the second user interface is associated with a second user device, and wherein the second user device has different physical dimensions from the user device.

14. The one or more non-transitory computer-readable media of claim 11, wherein the second profile associated with the second user indicates a location of a second user interface at which to present the component for a second user token interaction of a second token, the second token being different than the token.

15. The one or more non-transitory computer-readable media of claim 14, wherein the token and the second token each have a transmitting antenna, and wherein the transmitting antenna of the token is in a different position than the transmitting antenna of the second token.

16. The one or more non-transitory computer-readable media of claim 9, wherein obtaining the one or more second locations of the user interface further comprises:

generating, via a prediction model, based on the first feedback, a second signal-strength-related results prediction, the second signal-strength-related results prediction including a results probability associated with each of the one or more second locations of the user interface; and identifying the one or more second locations with the associated results probability greater than a threshold results probability.

17. The one or more non-transitory computer-readable media of claim 9, wherein the one or more first feedback results further include a historic interaction information, the historic interaction information including historic signal-strength-related results corresponding to historic token interactions.

18. The one or more non-transitory computer-readable media of claim 9, wherein obtaining the first feedback related to the one or more first token interactions includes accessing the profile.

* * * * *